April 2, 1963 W. KASTEN 3,083,833

FUEL HEATER-FILTER COMBINATION

Filed May 20, 1959 2 Sheets-Sheet 1

INVENTOR.
WALTER KASTEN
BY
William N. Antonis
ATTORNEY

April 2, 1963 W. KASTEN 3,083,833

FUEL HEATER-FILTER COMBINATION

Filed May 20, 1959 2 Sheets-Sheet 2

INVENTOR.
WALTER KASTEN
BY
William N. Antonis
ATTORNEY

United States Patent Office 3,083,833
Patented Apr. 2, 1963

3,083,833

FUEL HEATER-FILTER COMBINATION

Walter Kasten, Madison Heights, Mich., assignor to The Bendix Corporation, a corporation of Delaware Filed May 20, 1959, Ser. No. 814,617
10 Claims. (Cl. 210—184)

The present invention relates to a fuel filtering device, and more particularly to a filtering device in which the filtering element is heated to prevent the formation of ice on the surface thereof.

One of the problems encountered, while filtering fuel for aircraft during actual flight, is filter plugging and subsequent engine flame-out due to filter icing. Such icing is caused by the small amounts of water in the fuel which tend to accumulate in the form of ice on the surface of the filter element to such an extent that, oftentimes, a continuous impervious coating of ice will form on the entire surface of the element, thereby completely cutting off the flow of fuel to the engine.

There are various fuel heater and filter combinations presently being used by the aircraft industry, but most of these, in order to be effective in melting the ice from ice coated (plugged) filters, have to heat all of the fuel flowing at any instant through the system to a temperature above the melting point of the ice. If the heater device is a separate component from the filter device, as is the case in many of the current installations, the fuel is subjected to an additional heat loss while passing through the pipes from the heater to the filter. This means that a great amount of heat is required to be bled from the engine to heat the fuel.

It is, therefore, an object of this invention to provide a combination filter and heater device which will have a de-icing effect equivalent to existing devices even though less compressed bleed air is utilized for heating.

Instead of heating the fuel and then having the fuel melt the ice on the filter, it is an object of this invention to provide an integrated filter and heater arrangement wherein heater tubes and filter elements are in contact with each other so that heat may be transferred directly to the filter surfaces through means of conduction.

Another object of this invention is to provide an integrated filter and heater combination of the type described which involves less weight, plumbing and space than existing heater and filter arrangements.

A further object of this invention is to provide an integrated filter-heater structure which has a minimum number of joints and seals between the hot air and fuel compartments, thereby improving the reliability factor.

A still further object of this invention is to provide an integrated filter-heater structure which will permit easy removal of the filter elements for cleaning without disconnecting any of the fittings, lines or pipes attached to the air inlet and outlet and/or fuel inlet and outlet.

Another object of this invention is to provide an integrated filter-heater structure which will permit the use of any of many various types of filtering media.

An additional object of this invention is to provide a filter-heater assembly which is simple and relatively inexpensive to manufacture and which is readily adaptable to various aircraft engine configurations.

Other objects and advantages will become apparent from the following description and accompanying drawings, wherein.

Figure 1:
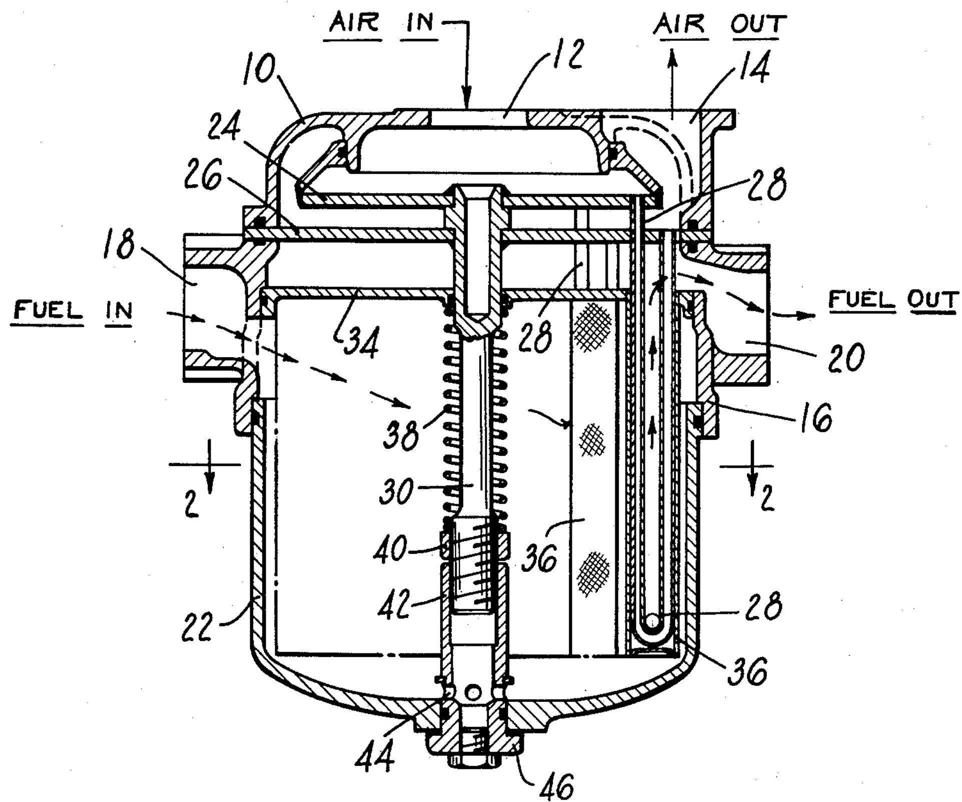
FIGURE 1 is a vertical section through my fuel heater-filter unit.
Figure 2:
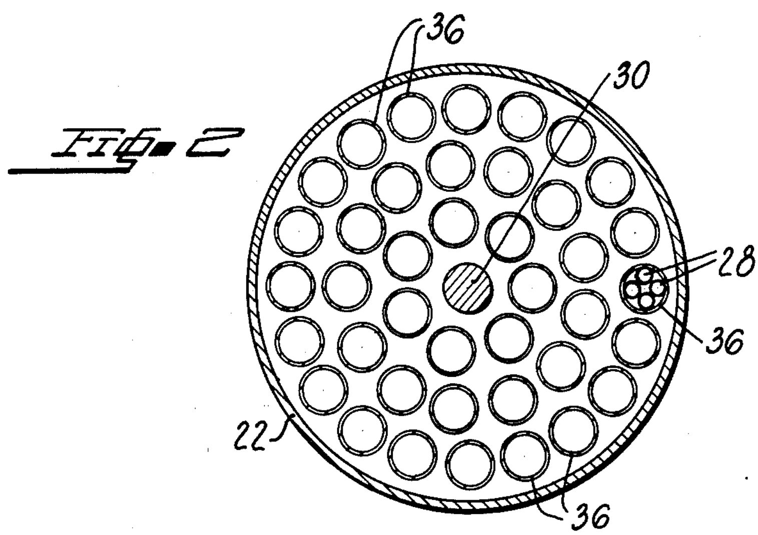
FIGURE 2 is a section taken on line 2—2 of FIGURE 1, showing only one set of heater tubes within a filter element.
Figure 4:
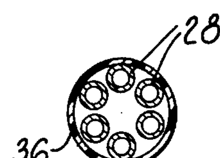
FIGURE 4 is a sectional view through one filter element showing the use of the three U-shaped heater tubes therein.

Referring to FIGURE 1 of the drawings, it will be noted that my fuel filter-heater housing includes a head 10 having an air inlet port 12 and an air outlet port 14, a center body 16 having a fuel inlet port 18 and a fuel outlet port 20, and a fuel bowl 22. Located within the housing is a heater tube and tube plate assembly which includes a first plate 24 which is interposed between the air inlet and outlet ports 12 and 14, a second plate 26 interposed between the air outlet port 14 and the fuel outlet port 20, a plurality of U-shaped tubes 28 (only two of which are shown in FIGURE 1) having one end suitably connected to plate 24 for communication with air inlet port 12 and having the other end suitably connected to plate 26 for communication with air outlet port 14, and a rod 30 suitably connected to plates 24 and 26. The tubes 28 may be formed of any suitable non-corrosive material having relatively high conductivity and may be nested in sets of two, three or more pairs, as desired. Note FIGURE 4 which shows three sets of U-shaped heater tubes 28. The heater tube and tube plate unit is held in assembled relationship by clamping the plate 26 between head 10 and center body 16 through suitable means such as a plurality of bolts (not shown).

Figure 6:
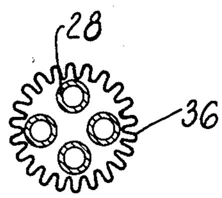
FIGURE 6 is a sectional view through an alternate filter element which is convoluted for increased filtering surface.
Figure 5:
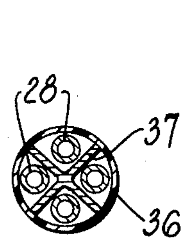
FIGURE 5 is a sectional view through a filter element having heater tubes and a reinforcing member therein.

Also located within the housing is a filter element assembly which includes a retainer plate 34 and a plurality of filter elements 36 which are suitably attached thereto. The filter elements may consist of tubular screens, wire wound elements, ribbon elements or any other types of elements having reasonably good conductivity which could be made in a wrap-around or substantially cylindrical unit and attached to the retainer plate 34. A convoluted screen, as shown in FIGURE 6, could be used where increased filtering area is desired, or a fine mesh tubular screen having a reinforcing member 37 therein could be used for increasing the rigidity thereof, as shown in FIGURE 5. The filter element assembly is positioned in the housing so that the filter elements 36 surround and are in contact with the U-shaped heater tubes 28, the assembly being held in position by a spring 38 located between retainer plate 34 and a nut 40 threaded onto rod 30. A hollow bolt 42 having drain passages 44 formed therein is threaded onto rod 30 and maintains bowl 22 in assembled relationship. A water drain plug 46 is provided for removal of any free water that may accumulate in the bottom of the bowl.

Figure 3:
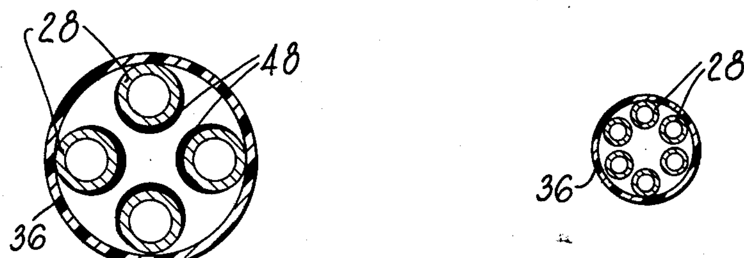
FIGURE 3 is an enlarged sectional view through one filter element and the set of heater tubes located therein showing the use of a thermal insulating coating on the inner portions of the heater tubes.

Operation of the device is as follows: Engine bleed air (hot lube oil or any other heating medium) enters air inlet port 12, flows through the U-shaped heater tubes 28 and leaves through air outlet port 14. The fuel to be filtered enters the fuel inlet port 18, flows through the filter elements 36 from the outside to the inside and leaves the unit via fuel outlet port 20. Any contaminants in the fuel will be deposited on the outside of the filter media and can be readily removed by back-flushing or cleaning. Since a sufficient amount of hot air will be circulated through the U-shaped tubes 28 to maintain each of the filter elements at a temperature sufficiently high to prevent accumulation of ice on the surface thereof, there will be no filter plugging and subsequent engine flame-out problem. To increase the efficiency of this unit, the heater tubes 28 could be covered, as shown in FIGURE 3, with a ceramic or other heat insulating coating 48 on that portion of their surface, which is not in contact with or not facing the filter surface. With such a coating, fuel, which has already passed through the filter element, will not be able to extract as much heat from the tubes as it flows along the tubes.

One of the many advantages of my fuel-heater configuration is the reduced number of welded or brazed joints between the hot air and fuel compartments. In my arrangement only one of the plates 24, 26, namely plate 26, is exposed to the fuel compartment. This improves the reliability factor since it reduces the number of possible leaks due to welding imperfections. Furthermore, with my arrangement it is possible to use practically any combination of air inlet and outlet connections and locations by using a different head casting with all the other components remaining standard. The same flexibility is also available with respect to the fuel inlet and outlet connections. By using various center body castings any desired fuel inlet and outlet configuration can be obtained. Furthermore, an extremely rugged mount can be obtained by extending the heater tube support plate 26.

The several practical advantages enumerated above, which flow from my invention, are believed to be obvious from the above description, and other advantages may suggest themselves to those who are familiar with the art to which this invention relates.

Having thus described the various features of the invention, what I claim as new and desire to secure by Letters Patent is:

1. A fuel filtering and heater device comprising a head having an air inlet port and an air outlet port, a center body having a fuel inlet port and a fuel outlet port, said center body being operatively connected to said head, a first plate interposed between said air inlet and outlet ports, a second plate interposed between said air outlet port and said fuel outlet port, said second plate being confined between said head and said center body, a U-shaped tube having one end connected to said first plate for communicating with said air inlet port and the other end connected to said second plate for communicating with said air outlet port, said tube being heated by the flow of hot air therethrough, a retainer plate interposed between said fuel inlet and outlet ports, a substantially tubular filter element of good conductivity and of the outside-in type connected to said retainer plate for filtering the fuel flowing from said fuel inlet to said fuel outlet port by permitting flow therethrough from the outside thereof to the inside thereof, said filter element surrounding said heated U-shaped tube and being in contact therewith along a substantial portion of its length so that said fuel after flowing through said filter element will flow along the length of said tube on the inside of said filter element, said heated tube preventing formation of ice on the filter element and in the fuel flowing through said filter element, and a bowl operatively connected to said second plate and said center body.

2. A fuel filtering and heater device as defined in claim 1 wherein the portion of the U-shaped heated tube not in contact with the filter element is coated with a heat insulating material.

3. A fluid filtering and heater device comprising a housing having first inlet and outlet ports for a first fluid and second inlet and outlet ports for a second fluid, a first plate interposed between said first inlet port and said first outlet port, a second plate interposed between said first outlet port and said second outlet port, said second plate being operatively connected to said housing, a U-shaped tube having one end connected to said first plate for communicating with said first inlet port and the other end connected to said second plate for communicating with said first outlet port, said tube being heated by the flow of said first fluid therethrough, a retainer plate interposed between said second inlet port and said second outlet port, and a substantially tubular filter element of good conductivity and of the outside in type connected to said retainer plate for filtering the second fluid flowing from said second inlet port to said second outlet port by permitting flow therethrough from the outside thereof to the inside thereof, said filter element surrounding said heated U-shaped tube and being in contact therewith along a substantial portion of its length so that said second fluid after flowing through said filter element will flow along the length of said tube on the inside of said filter element, said heated tube preventing formation of ice on the filter element and in the fuel flowing through said filter element.

4. A fluid filtering and heater device as defined in claim 3 wherein said filter element surrounds and is in contact with a plurality of U-shaped heated tubes.

5. A fluid filtering and heater device as defined in claim 3 wherein said filter element is convoluted for increased filtering surface.

6. A fluid filtering and heater device as defined in claim 3 wherein reinforcing means are located within said filter element.

7. A fuel filtering and heater device comprising a housing having first inlet and outlet ports for passing a heated fluid therethrough and second inlet and outlet ports for passing fuel therethrough, means for separating said first inlet and outlet ports from said second inlet and outlet ports, passage means for communicating said second inlet and outlet ports, a substantially cylindrical filter element of good conductivity and of the outside-in type located in said passage means for filtering said fuel by permitting flow therethrough from the outside thereof to the inside thereof, and a U-shaped tubular member located within and in contact with a substantial portion of the length of said filter element for transferring heat through conduction to said filter element and to the fuel flowing along said tubular member on the inside of said filter element to thereby prevent the formation of ice on the filter element and in the fuel flowing through said filter element, said tubular member having one end communicating with said first inlet port and the other end with said first outlet port.

8. A fluid filtering and heater device comprising a housing having first inlet and outlet ports for passing a heated fluid therethrough and second inlet and outlet ports for passing a second fluid therethrough, a plate for separating said first inlet and outlet ports from said second inlet and outlet ports, passage means for communicating said second inlet and outlet ports, a substantially cylindrical filter element of good conductivity and of the outside-in type located in said passage means for filtering said second fluid by permitting flow therethrough from the outside thereof to the inside thereof, and a tubular member located within and in contact with a substantial portion of the length of said filter element for transferring heat through conduction to said filter element and to the second fluid flowing along said tubular member on the inside of said filter element to thereby prevent the formation of ice on the filter element and in the second fluid flowing through said filter element, said tubular member having one end extending through said plate and communicating with said first inlet port and the other end extending through said plate and communicating with said first outlet port.

9. A fluid filtering and heater device comprising a housing having a first chamber formed therein communicating with a first inlet port for permitting ingress of a first fluid, a second chamber formed therein communicating with a first outlet port for permitting egress of said first fluid, a third chamber formed therein for communicating with a second inlet port and a second outlet port for permitting ingress and egress of a second fluid, partition means for separating said chambers from each other, a substantially tubular filter element of good conductivity and of the outside-in type located in said third chamber and interposed between said second inlet and outlet ports for filtering said second fluid by permitting flow therethrough from the outside thereof to the inside thereof, and conduit means located within and in contact with a substantial portion of the length of said filter element for transferring heat thereto and to the second fluid flowing along said conduit means on the inside of said filter element to thereby prevent the formation of ice on the filter element and in the second fluid flowing through said filter element, said conduit means communicating said first chamber with said second chamber.

10. A fluid filtering and heater device comprising a housing having first inlet and outlet ports for passing an initially hot fluid therethrough and second inlet and outlet ports for passing a second fluid therethrough, partition means for separating said first inlet and outlet ports from said second inlet and outlet ports, a substantially tubular filter element of good conductivity and of the outside-in type located in said housing and interposed between said second inlet and outlet ports for filtering said second fluid by permitting flow therethrough from the outside thereof to the inside thereof, and a hollow member located within and in contact with a substantial portion of the length of said filter element for transferring heat thereto and to said second fluid flowing along the inside of said filter element to thereby prevent the formation of ice on the filter element and in the second fluid flowing through said filter element, said hollow member being interposed in the fluid stream between the first inlet and outlet ports and having two separated openings, one of which communicates with said first inlet port and the other of which communicates with said first outlet port.

References Cited in the file of this patent

UNITED STATES PATENTS

| | | |
|---|---|---|
| 1,900,821 | Kline | Mar. 7, 1933 |
| 2,401,797 | Rasmussen | June 11, 1946 |
| 2,428,939 | Morris | Oct. 14, 1947 |
| 2,547,021 | Lassiat et al. | Apr. 3, 1951 |